(12) United States Patent
Yang et al.

(10) Patent No.: US 12,066,626 B2
(45) Date of Patent: Aug. 20, 2024

(54) NEAR-TO-EYE DISPLAY DEVICE AND AUGMENTED REALITY APPARATUS

(71) Applicant: BOE TECHNOLOGY GROUP CO., LTD., Beijing (CN)

(72) Inventors: Junxing Yang, Beijing (CN); Zhenxing Zhou, Beijing (CN); Sen Ma, Beijing (CN); Yishan Tian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 601 days.

(21) Appl. No.: 17/309,835

(22) PCT Filed: Dec. 29, 2020

(86) PCT No.: PCT/CN2020/140572
§ 371 (c)(1),
(2) Date: Jun. 22, 2021

(87) PCT Pub. No.: WO2021/169563
PCT Pub. Date: Sep. 2, 2021

(65) Prior Publication Data
US 2022/0308343 A1    Sep. 29, 2022

(30) Foreign Application Priority Data

Feb. 25, 2020 (CN) .......................... 202010115103.8

(51) Int. Cl.
*G02B 27/01* (2006.01)
*F21V 8/00* (2006.01)
*G02F 1/29* (2006.01)

(52) U.S. Cl.
CPC ....... *G02B 27/0101* (2013.01); *G02B 6/0026* (2013.01); *G02B 6/005* (2013.01);
(Continued)

(58) Field of Classification Search
CPC .................................................. G02B 27/0172
See application file for complete search history.

(56) References Cited

U.S. PATENT DOCUMENTS

| 9,581,820 B2 | 2/2017 | Robbins |
| 2017/0139210 A1 | 5/2017 | Vallius |

FOREIGN PATENT DOCUMENTS

| CN | 205643869 U | 10/2016 |
| CN | 107561696 A | 1/2018 |

(Continued)

OTHER PUBLICATIONS

Office Action dated Jan. 27, 2021 issued in corresponding Chinese Application No. 202010115103.8.
(Continued)

*Primary Examiner* — Joseph P Martinez
(74) *Attorney, Agent, or Firm* — Nath, Goldberg & Meyer; Joshua B. Goldberg (57) ABSTRACT

There is provided a near-to-eye display device, including: an optical waveguide; at least one in-coupling grating on a surface of the optical waveguide and configured to couple received parallel light into the optical waveguide for propagating by total internal reflection; a light out-coupling structure on the surface of the optical waveguide and configured to extract the light propagating by total internal reflection in the optical waveguide to become an outgoing light from the optical waveguide; and an optical lens configured to receive the outgoing light, remain an outgoing direction of the outgoing light with a first polarization direction, and converge or diverge the outgoing light with a second polarization direction. There is further provided an augmented reality apparatus including the near-to-eye display device.

18 Claims, 4 Drawing Sheets

(52) U.S. Cl.
CPC ........ *G02F 1/29* (2013.01); *G02B 2027/0129* (2013.01); *G02B 2027/0152* (2013.01); *G02F 2203/07* (2013.01)

(56) References Cited

FOREIGN PATENT DOCUMENTS

| | | | | |
|---|---|---|---|---|
| CN | 107966819 | A | 4/2018 | |
| CN | 108292042 | A | 7/2018 | |
| CN | 108474956 | * | 8/2018 | ............. G02B 27/22 |
| CN | 108474956 | A | 8/2018 | |
| CN | 108803022 | A | 11/2018 | |
| CN | 109870811 | A | 6/2019 | |
| CN | 110297331 | A | 10/2019 | |
| CN | 110376737 | A | 10/2019 | |
| CN | 110471185 | A | 11/2019 | |
| CN | 110515209 | * | 11/2019 | ............. G02B 27/01 |
| CN | 110515209 | A | 11/2019 | |
| CN | 111158183 | A | 5/2020 | |

OTHER PUBLICATIONS

Office Action dated Aug. 11, 2021 issued in corresponding Chinese Application No. 202010115103.8.
Office Action dated Dec. 16, 2021 issued in corresponding Chinese Application No. 202010115103.8.

\* cited by examiner

NEAR-TO-EYE DISPLAY DEVICE AND AUGMENTED REALITY APPARATUS

CROSS-REFERENCE TO RELATED APPLICATIONS

This is a National Phase Application filed under 35 U.S.C. 371 as a national stage of PCT/CN2020/140572, filed on Dec. 29, 2020, an application claiming priority to Chinese patent application No. 202010115103.8, filed on Feb. 25, 2020, the entire contents of each of which are incorporated herein by reference.

TECHNICAL FIELD

The present disclosure relates to the field of display technology, and in particular to a near-to-eye display device (which may also be referred to as a near eye display device) and an augmented reality apparatus.

BACKGROUND

In recent years, near-to-eye display technology is rapidly developing. Virtual Reality (VR) and Augmented Reality (AR) technologies are most representative, and provide excellent audio-visual experience to people. The near-to-eye display technology can project an image directly into eyes of a viewer, thereby obtaining an immersive display experience.

The existing near-to-eye display device generally has a problem of accommodation vergence conflict, which easily causes visual fatigue of a user when viewing.

SUMMARY

The present disclosure is directed to at least solve one of the technical problems in the prior art, and provides a near-to-eye display device and an augmented reality apparatus to alleviate visual fatigue of a user.

To achieve the above objects, the present disclosure provides a near-to-eye display device, including: an optical waveguide; at least one in-coupling grating on a surface of the optical waveguide and configured to couple received parallel light into the optical waveguide for propagating by total internal reflection; a light out-coupling structure on the surface of the optical waveguide and configured to extract the light propagating by total internal reflection in the optical waveguide to generate outgoing light from the optical waveguide; an optical lens configured to receive the outgoing light, remain an outgoing direction of the outgoing light with a first polarization direction unchanged, and converge or diverge the outgoing light with a second polarization direction.

In some embodiments, the at least one in-coupling grating includes a plurality of the in-coupling gratings, and the near-to-eye device further includes: a plurality of display panels in one-to-one correspondence with the plurality of in-coupling gratings; and a plurality of projectors in one-to-one correspondence with the plurality of display panels, wherein each of the projectors is configured to modulate divergent light emitted from all positions of the corresponding display panel into parallel light irradiating towards the corresponding in-coupling grating, and polarization directions of the parallel light modulated by the plurality of projectors include the first polarization direction and the second polarization direction.

In some embodiments, each of the projectors includes: a convex lens between the corresponding display panel and the optical waveguide, wherein the corresponding display panel is on a focal plane of the convex lens; and a polarizer between the corresponding display panel and the optical waveguide, and configured to convert received natural light into linearly polarized light; wherein polarization directions of the linearly polarized light converted by polarizers of the projectors include the first polarization direction and the second polarization direction.

In some embodiments, each of the in-coupling gratings is a reflective grating on a side of the optical waveguide distal to the projectors.

In some embodiments, each of the in-coupling gratings is a transmissive grating between the optical waveguide and a corresponding projector.

In some embodiments, the number of the in-coupling gratings is two, and the light out-coupling structure is between the two in-coupling gratings.

In some embodiments, the light out-coupling structure includes a composite grating configured to extract light coupled into the optical waveguide by the in-coupling gratings.

In some embodiments, the composite grating is a reflective grating on a side of the optical waveguide distal to the optical lens.

In some embodiments, the composite grating is a transmissive grating between the optical waveguide and the optical lens.

In some embodiments, the light out-coupling structure includes a first out-coupling grating and a second out-coupling grating, the first out-coupling grating is on a side of the optical waveguide distal to the optical lens, and configured to diffract the light coupled into the optical waveguide by one in-coupling grating of the two in-coupling gratings towards the optical lens, and the light diffracted by the first out-coupling grating is emitted to the optical lens; the second out-coupling grating is between the optical waveguide and the optical lens, and configured to diffract the light coupled into the optical waveguide by the other in-coupling grating of the two in-coupling gratings, the light diffracted by the second out-coupling grating is emitted to the optical lens, and the light diffracted by the first out-coupling grating and the light diffracted by the second out-coupling grating together form the outgoing light from the optical waveguide.

In some embodiments, each in-coupling grating and the optical lens are on a same side of the optical waveguide.

In some embodiments, the optical lens is a liquid crystal lens.

In some embodiments, the near-to-eye display device further includes a compensation lens on a side of the optical waveguide distal to the optical lens, and configured to keep a direction of light with the first polarization direction, and diverge or converge light with the second polarization direction.

In some embodiments, the compensation lens is a liquid crystal lens.

In some embodiments, the first polarization direction is a polarization direction of S-polarized light and the second polarization direction is a polarization direction of P-polarized light.

In order to achieve the above objects, an embodiment of the present disclosure further provides an augmented reality apparatus, including the near-to-eye display device described above.

BRIEF DESCRIPTION OF DRAWINGS

Drawings, which are included to provide a further understanding of the present disclosure and constitute a part of this specification, illustrate the present disclosure together with the detailed description, but do not limit the present disclosure. In the drawings.

DETAIL DESCRIPTION OF EMBODIMENTS

To make the objects, technical solutions and advantages of the embodiments of the present disclosure more clear, the technical solutions of the embodiments of the present disclosure will be clearly and completely described below with reference to the drawings of the embodiments of the present disclosure. Obviously, the described embodiments are only a few (not all) embodiments of the present disclosure. All other embodiments, which may be derived by a person skilled in the art from the described embodiments of the present disclosure without inventive labor, are within the scope of protection of the present disclosure.

The terms used herein to describe embodiments of the present disclosure are not intended to limit and/or define the scope of the present disclosure. For example, unless defined otherwise, technical or scientific terms used in the present disclosure should have a common meaning as understood by a person skilled in the art to which this invention belongs. It should be understood that "first", "second" and the like, as used in the present disclosure, do not denote any order, quantity, or importance, but rather are used to distinguish one element from another. The singular forms "a," "an," or "the" and the like do not denote a limitation of the number of items, but rather denote the presence of at least one item, unless clearly defined in the context otherwise.

Conventional 3D display technologies include near-to-eye binocular parallax display technology, naked-eye binocular parallax display technology, and multi-view display technology, which have a problem of accommodation vergence conflict due to the lack of sufficient parallax images. That is, different parallax images are generated on the left and right eyes when a user perceives a 3D image. When the user views the 3D image, an accommodation depth generated by adjustment of eye lenses is always fixed on a display panel, and a vergence depth generated by the eye movement varies according to a spatial position at which a 3D object is located, such that the accommodation depth is inconsistent with the vergence depth, thereby causing the problem of accommodation vergence conflict, and further causing visual fatigue.

Figure 1:
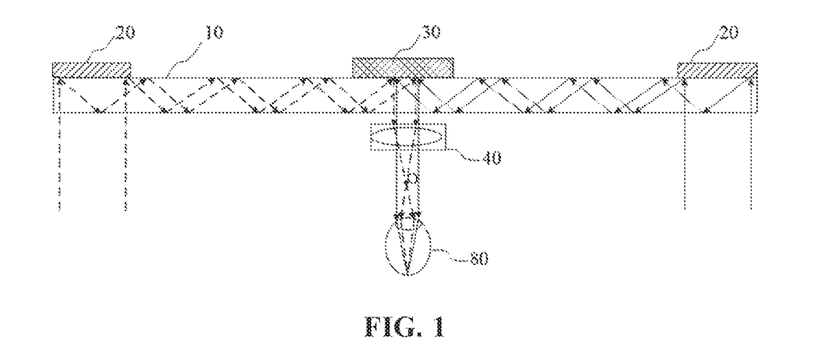
FIG. 1 is a schematic diagram of a near-to-eye display device according to some embodiments of the present disclosure.

An embodiment of the present disclosure provides a near-to-eye display device. FIG. 1 is a schematic diagram of a near-to-eye display device according to some embodiments of the present disclosure. As shown in FIG. 1, the near-to-eye display device includes: an optical waveguide 10, in-coupling gratings (which may also be referred to as coupling-in gratings) 20, a light out-coupling structure 30 and an optical lens 40.

Alternatively, the optical waveguide 10 is a planar waveguide for light propagating, and supporting the in-coupling gratings 20 and the light out-coupling structure 30. The optical waveguide 10 is a transparent structure having a refractive index greater than that of air. For example, the optical waveguide 10 is a glass plate or a PMMA (polymethyl methacrylate) plate. When the optical waveguide 10 is a PMMA plate, the entire weight of the near-to-eye display device may be reduced, which is advantageous for wearing.

The coupling gratings 20 are provided on a surface of the optical waveguide 10 and configured to couple received parallel light into the optical waveguide 10 for total internal reflection propagation. Alternatively, the optical waveguide 10 has a first surface proximal to a human eye 80 and a second surface opposite to the first surface. The in-coupling gratings 20 may be disposed on the first surface or the second surface of the optical waveguide 10, as long as it may couple light into the optical waveguide 10 for total internal reflection propagation. In practical applications, a critical angle of total internal reflection of light propagating through the optical waveguide 10 may be determined according to the refractive index of the optical waveguide 10, and the structure of the coupling gratings 20 may be designed according to the critical angle of total internal reflection and an angle range of the parallel light emitted to the coupling gratings 20, such that the light passing through the coupling grating 20 becomes diffracted light and then enters into the optical waveguide 10, and incident angles of the diffracted light incident on the first surface and the second surface of the optical waveguide 10 are both greater than the critical angle of total internal reflection.

The light out-coupling structure 30 is provided on the surface of the optical waveguide 10 and configured to extract the light propagating by total internal reflection in the optical waveguide 10 to form an outgoing light from the optical waveguide 10. It should be noted that, the in-coupling gratings 20 may receive multiple parallel light beams, each parallel light beam is coupled into the optical waveguide 10 by the in-coupling gratings 20 and propagates in the optical waveguide 10. When being extracted by the light out-coupling structure 30, the parallel light is still a parallel light beam; and an exit angle of the parallel light beam may be the same as the incident angle of the parallel light beam coupled into the optical waveguide 10.

The optical lens 40 is configured to receive the outgoing light from the optical waveguide 10. For the outgoing light with a first polarization direction, the optical lens 40 is equivalent to a transparent plane mirror, which does not change an outgoing direction of the outgoing light with the first polarization direction. For the outgoing light with a second polarization direction, the optical lens 40 may converge or diverge the outgoing light with the second polarization direction. As shown in FIG. 1, when the optical lens 40 converges the outgoing light with the second polarization direction, the outgoing light with the second polarization direction passes through the optical lens 40 and is converged at a point O. It is noted that in the drawings of the present disclosure, the near-to-eye display device is schematically described by taking an example that the optical lens 40 converges the outgoing light with the second polarization direction, which does not limit the present disclosure. In practical applications, the optical lens 40 may diverge the outgoing light with the second polarization direction.

In some embodiments of the present disclosure, the first polarization direction is orthogonal to the second polarization direction. For example, the first polarization direction is a polarization direction of S-polarized light, and the second polarization direction is a polarization direction of P-polarized light.

In the embodiment of the present disclosure, two display modules may provide light to the two in-coupling gratings 20 respectively. For example, the display modules may simultaneously provide first parallel light corresponding to a first image and second parallel light corresponding to a second image to the in-coupling gratings 20. A polarization direction of the first parallel light is the first polarization direction, a polarization direction of the second parallel light is the second polarization direction, and the first image and the second image may be images of a same 3D object with different depths of field. In this way, the first parallel light is extracted by the light out-coupling structure 30 after passing through the optical waveguide 10 by total internal reflection, and then directly passes through the optical lens 40 and enters the human eye 80, thereby imaging at infinity in front. The second parallel light is extracted by the light out-coupling structure 30 after passing through the optical waveguide 10 by total internal reflection, and then enters the human eye 80 after being converged by the optical lens 40, thereby imaging at a focal point in front, or the second parallel light enters the human eye 80 after being diverged by the optical lens 40, thereby imaging at a point of intersection of reverse extension lines of the divergent light. Therefore, the human eye 80 may simultaneously view images of two different depths of field, thereby realizing a 3D display effect, reducing the problem of accommodation vergence conflict during viewing, and further alleviating the visual fatigue of the human eyes during viewing.

Alternatively, the light provided to the in-coupling gratings 20 may be provided by a same display module. For example, the display module alternately provides the first parallel light corresponding to the first image and the second parallel light corresponding to the second image to a same in-coupling grating 20. A speed of switching the first image and the second image is fast, such that the human eye 80 simultaneously views the images at two different depths of field, so as to alleviate the visual fatigue of the human eyes when viewing.

In some embodiments, as shown in FIG. 1, there are a plurality of in-coupling gratings 20. In the embodiment of the present disclosure, an example will be described in which there are two in-coupling gratings 20. The light out-coupling structure 30 is located between the two in-coupling gratings 20, and light coupled into the optical waveguide 10 by the first in-coupling grating 20 and light coupled into the optical waveguide 10 by the second in-coupling grating 20 propagate in opposite directions in the optical waveguide 10 to the light out-coupling structure 30, and are then coupled out of the optical waveguide 10 by the light out-coupling structure 30.

Figure 2:
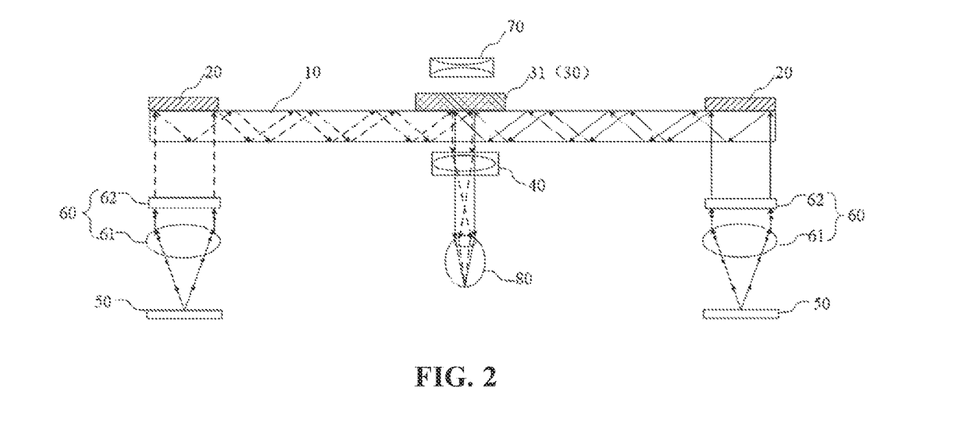
FIG. 2 is a schematic diagram of a near-to-eye display device according to some embodiments of the present disclosure.

FIG. 2 is a schematic diagram of a near-to-eye display device according to some embodiments of the present disclosure. As shown in FIG. 2, the near-to-eye display device further includes: display panels 50 in one-to-one correspondence with the in-coupling gratings 20 and projectors 60 in one-to-one correspondence with the display panels 50. The display panel 50 is a display panel for displaying a two-dimensional image, such as a liquid crystal display panel, an OLED (Organic Light-Emitting Diode) display panel, and the like, and the emitted light is natural light. The projector 60 is configured to modulate the divergent light emitted from all positions of the corresponding display panel 50 into parallel light irradiating towards the corresponding in-coupling grating 20, and polarization directions of the parallel light modulated by the plurality of projectors 60 include the first polarization direction and the second polarization direction.

In some embodiments, the projector 60 includes: a convex lens 61 and a polarizer 62. The convex lens 61 is disposed between the corresponding display panel 50 and the optical waveguide 10, and the optical axis thereof may be parallel to a thickness direction of the optical waveguide 10. The display panel 50 is located on a focal plane of the convex lens 61. The convex lens 61 may be made of glass or PMMA. The polarizer 62 is configured to convert the received natural light into linearly polarized light; polarization directions of the linearly polarized light converted by the plurality of polarizers 62 include the first polarization direction and the second polarization direction. For example, as shown in FIG. 2, the polarizer 62 is positioned between the convex lens 61 and the optical waveguide 10, the polarizer 62 converts the light from the convex lens 61 into P-polarized light in the left of FIG. 2, and the polarizer 62 converts the light from the convex lens 61 into S-polarized light in the right of FIG. 2. In FIG. 2, arrows with solid lines having no dot indicate S-polarized light, dotted lines indicate P-polarized light, and arrows with solid lines having dots indicate natural light.

It should be noted that, the polarizers 62 in the embodiment of the present disclosure are not limited to being arranged at the positions shown in FIG. 2. For example, each polarizer 62 may also be disposed between the corresponding display panel 50 and the corresponding convex lens 61.

Figure 3:
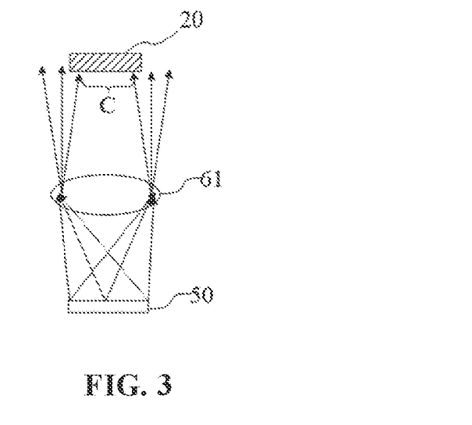
FIG. 3 is a schematic diagram illustrating light paths of light at different positions of a display panel passing through a convex lens according to some embodiments of the present disclosure.

FIG. 2 schematically shows the light refracted by the convex lens 61 by only taking the light emitted from a central position of the display panel 50 as an example. But it should be understood that the light emitted from each position of the display panel 50 forms a parallel light beam after passing through the convex lens 61. FIG. 3 is a schematic diagram of light paths of light at different positions of a display panel passing through a convex lens according to some embodiments of the present disclosure. As shown in FIG. 3, the light emitted from two edge positions and the central position of the display panel 50 passes through the convex lens 61, becoming three parallel light beams. When the three parallel light beams strike a plane where the in-coupling grating 20 is located, an overlapping area C is formed on the plane, and the in-coupling grating 20 at least covers the overlapping area C, so that the light emitted from respective positions of the display panel 50 may be received, and then the human eyes 80 may view images displayed at respective positions of the display panel 50.

In some embodiments, as shown in FIG. 2, the in-coupling gratings 20 are reflective gratings located on a side of the optical waveguide 10 distal to the projectors 60. The projectors 60 and the optical lens 40 are located on the same side of the optical waveguide 10, thereby improving the compactness of the near-to-eye display device.

The light out-coupling structure 30 includes a composite grating 31 configured to extract light that is coupled into the optical waveguide 10 by each of the in-coupling gratings 20. That is, the composite grating 31 diffracts light propagating from two opposite directions to the position where the composite grating 31 is located. In a specific example, the composite grating 31 is a reflective grating disposed on a side of the optical waveguide 10 distal to the optical lens 40. The light propagating in the optical waveguide 10 by total internal reflection is diffracted by the composite grating 31, and the diffracted light passes through the optical waveguide 10 and then strikes the optical lens 40. Alternatively, the composite grating 31 is a transmissive grating disposed on a side of the optical waveguide 10 proximal to the optical lens 40, so that the light propagating in the optical waveguide 10 by total internal reflection passes through the composite grating 31 and then strikes the optical lens 40.

Figure 4:
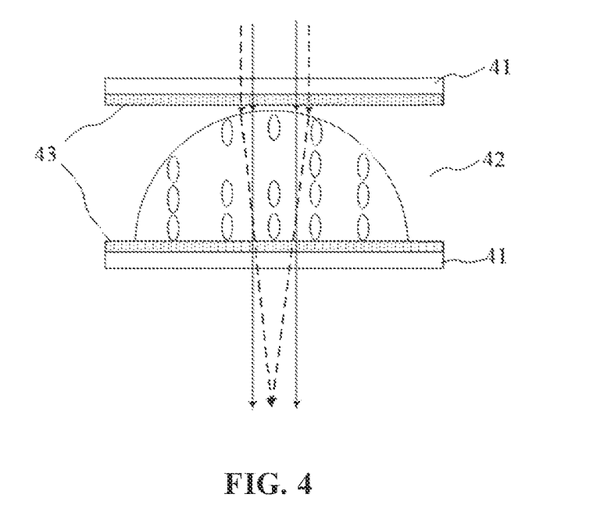
FIG. 4 is a schematic diagram illustrating how to modulate light with different polarization directions by an optical lens according to some embodiments of the present disclosure.

FIG. 4 is a schematic diagram illustrating how to modulate light with different polarization directions by an optical lens according to some embodiments of the present disclosure. As shown in FIG. 4, in some embodiments, the optical lens 40 is a liquid crystal lens. Specifically, the liquid crystal lens includes two substrates 41 and a liquid crystal layer 42 between the two substrates 41, and two electrode layers 43 are further provided on the two substrates 41, respectively. By applying voltages to the two electrode layers 43, an electric field is provided to the liquid crystal layer 42, thereby controlling a rotation direction of liquid crystals, and further converging or diverging linearly polarized light (as shown by the dotted arrow in FIG. 4) with the second polarization direction by the liquid crystal lens. In this way, linearly polarized light (as shown by the solid arrow in FIG. 4) with the first polarization direction may directly pass through the liquid crystal lens.

Figure 5:
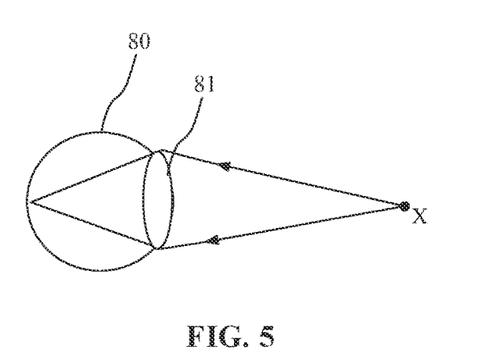
FIG. 5 is a schematic diagram illustrating a principle of imaging in a human eye under normal conditions.
Figure 6:
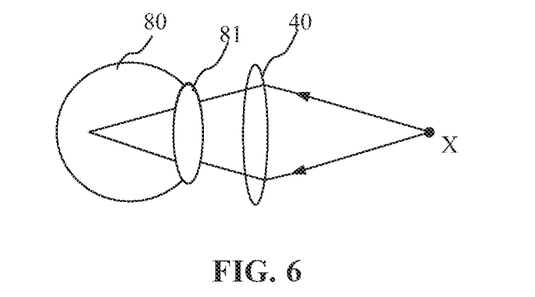
FIG. 6 is a schematic diagram illustrating a principle of imaging in a human eye with an optical lens provided in front of the human eye.

In the embodiment of the present disclosure, when the light of the display panel 50 enters the human eyes 80, the external environment light in front may also enter the human eyes 80 through the optical lens 40, so that the user may view the external environment while viewing the displayed image, thereby realizing the augmented reality effect. The optical lens 40 converges or diverges the light with the second polarization direction, thereby obscuring the external environment viewed by the human eyes 80. FIG. 5 is a schematic diagram illustrating a principle of imaging in a human eye under normal conditions. FIG. 6 is a schematic diagram illustrating a principle of imaging in a human eye with an optical lens provided in front of a human eye. As shown in FIG. 5, when the human eye 80 views an external object X under normal conditions, light of the object X is refracted by an eye lens 81 and falls on a retina; as shown in FIG. 6, when the optical lens 40 is disposed in front of the human eye 80 and the optical lens 40 converges a polarized component in the second polarization direction in the ambient light, an image of the external object X in the human eye 80 is located in front of the retina, so that the external environment viewed by the human eye 80 becomes blurred. Similarly, when the optical lens 40 diverges the polarized component in the second polarization direction in the ambient light, the image of the external object X in the human eye 80 is behind the retina, so that the external environment viewed by the human eye 80 also becomes blurred.

Figure 7:
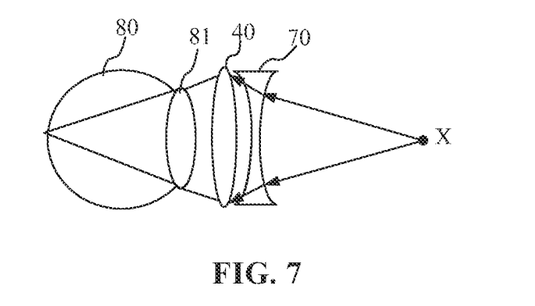
FIG. 7 is a schematic diagram illustrating a principle of imaging in a human eye with an optical lens and a compensating lens provided in front of the human eye.

In order to enable the external object to be clearly imaged in the human eyes, in some embodiments, as shown in FIG. 2, the near-to-eye display device may further include: a compensation lens 70, and the compensation lens 70 is located on a side of the optical waveguide 10 distal to the optical lens 40, does not change the direction of the light with the first polarization direction, and diverges or converges the light with the second polarization direction. Specifically, when the optical lens 40 is used for converging the light with the second polarization direction, the compensation lens 70 is used for diverging the light with the second polarization direction; when the optical lens 40 is used for diverging the light with the second polarization direction, the compensation lens 70 is used for converging the light with the second polarization direction. FIG. 7 is a schematic diagram illustrating a principle of imaging in a human eye with an optical lens and a compensating lens provided in front of the human eye. The optical lens 40 in FIG. 7 converges light with the second polarization direction, the compensation lens 70 diverges light with the second polarization direction. Arrows in FIG. 7 indicate polarized component in the second polarization direction in external environment light. For the polarized component in the second polarization direction, the diverging effect of the compensation lens 70 and the converging effect of the optical lens 40 are complementary to each other, and the polarized component in the first polarization direction may directly pass through the optical lens 40 and the compensation lens 70 and then enters the human eyes, so that the light with the first polarization direction and the second polarization direction may both fall on the retina, so that the human eyes may view the external environment more clearly. Similarly, when the optical lens 40 diverges the light with the second polarization direction and the compensation lens 70 converges the light with the second polarization direction, the human eyes may view the external environment more clearly.

In a specific example, the compensation lens 70 is a liquid crystal lens, and has a same structure as that of the liquid crystal lens in FIG. 4. In this case, the compensation lens 70 may achieve a light-shielding effect by adjusting the rotation direction of the liquid crystals, and at this time, human eyes may not view the external environment any more, thereby achieving a virtual display effect.

Next, the display procedure of the near-to-eye display device shown in FIG. 2 will be described by taking an example in which the light with the first polarization direction is S-polarized light and the light with the second polarization direction is P-polarized light. As shown in FIG. 2, the light emitted from the display panel 50 on the left side passes through the convex lens 61 and the polarizer 62 to form parallel light in a P-polarized state; the light emitted from the display panel 50 on the right side passes through the convex lens 61 and the polarizer 62 to form parallel light in an S-polarized state. When striking the corresponding in-coupling grating 20, the parallel light in the P-polarized state enters the optical waveguide 10 and propagates by total internal reflection under the modulation effect of the in-coupling grating 20; When striking the corresponding in-coupling grating 20, the parallel light in the S-polarized state enters the optical waveguide 10 and propagates by total internal reflection. When propagating to the light out-coupling structure 30 in opposite directions, the S-polarized light and the P-polarized light are emitted from the optical waveguide 10 by the modulation effect of the light out-coupling structure 30. The S-polarized light emitted from the optical waveguide 10 directly passes through the optical lens 40 and enters the human eye 80, so that the human eye 80 views the image displayed by the display panel 50 on the left side; the P-polarized light emitted from the optical waveguide 10 is converged or diverged by the optical lens 40 and enters the human eye 80, so that the human eye 80 views the image displayed by the display panel 50 on the right side. At the same time, the external environment light enters the human eye 80 through the compensation lens 70 and the optical lens 40, so that the human eye 80 views the external environment.

Figure 8:
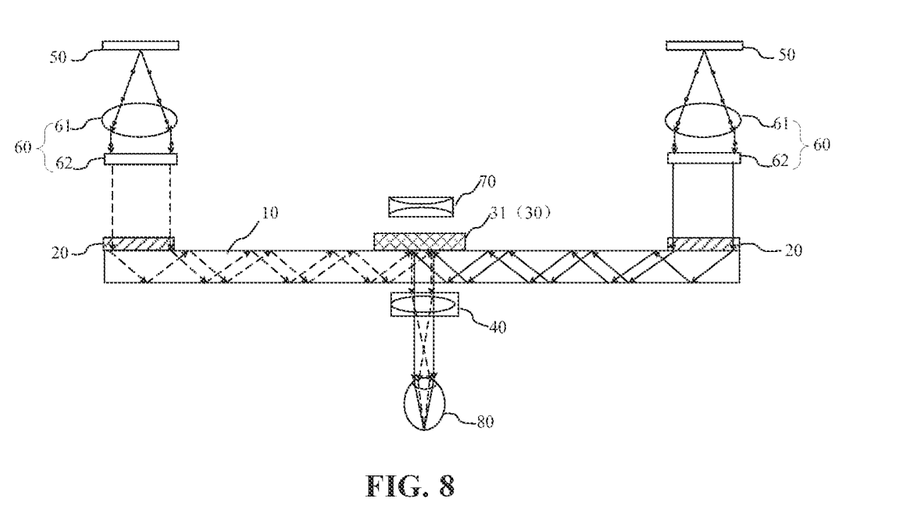
FIG. 8 is a schematic diagram of a near-to-eye display device according to some embodiments of the present disclosure.

FIG. 8 is a schematic diagram of a near-to-eye display device according to some embodiments of the present disclosure. As shown in FIG. 8, the near-to-eye display device also includes: the optical waveguide 10, the two in-coupling gratings 20, the light out-coupling structure 30, the optical lens 40, the compensation lens 70, the display panels 50 in one-to-one correspondence with the in-coupling gratings 20, and the projectors 60 in one-to-one correspondence with the in-coupling gratings 20. Unlike the structure shown in FIG. 2, in the near-to-eye display device shown in FIG. 8, the in-coupling gratings 20 each are a transmissive grating, the two in-coupling gratings 20 and the light out-coupling structure 30 are located on a same side of the optical waveguide 10, and the in-coupling gratings 20 and the optical lens 40 are located on opposite sides of the optical waveguide 10.

Figure 9:
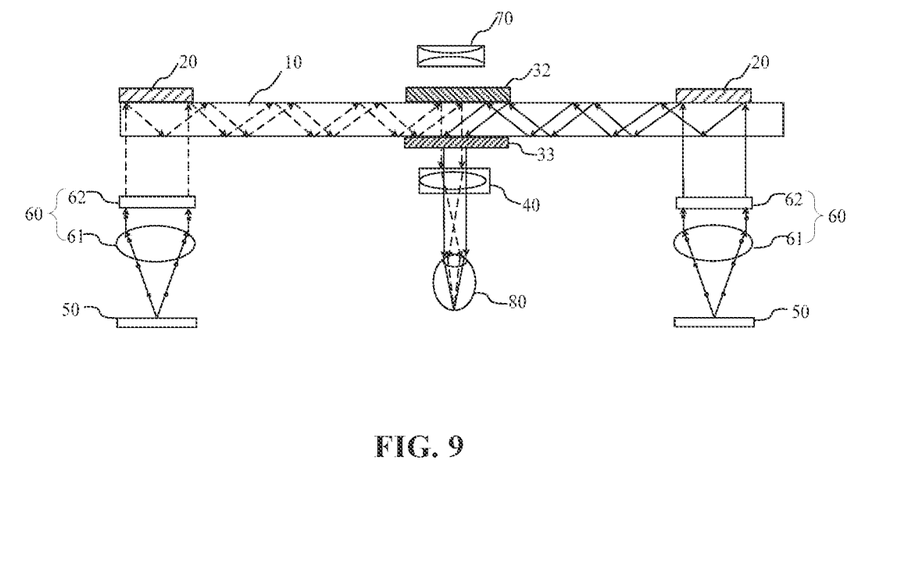
FIG. 9 is a schematic diagram of a near-to-eye display device according to some embodiments of the present disclosure.

FIG. 9 is a schematic diagram of a near-to-eye display device according to some embodiments of the present disclosure. As shown in FIG. 9, the near-to-eye display device also includes: the optical waveguide 10, the two in-coupling gratings 20, the light out-coupling structure 30, the optical lens 40, the compensation lens 70, the display panels 50 in one-to-one correspondence with the in-coupling gratings 20, and the projectors 60 in one-to-one correspondence with the in-coupling gratings 20. Unlike the structure shown in FIG. 2, in the near-to-eye display device shown in FIG. 9, the light out-coupling structure 30 includes: a first out-coupling grating (which may also be referred to as a first coupling-out grating) 32 and a second out-coupling grating (which may also be referred to as a second coupling-out grating) 33. The first out-coupling grating 32 is a reflective grating located on a side of the optical waveguide 10 distal to the optical lens 40, and is used for diffracting the light coupled into the optical waveguide 10 by one of the two in-coupling gratings 20. The light diffracted by the first out-coupling grating 32 strikes the optical lens 40. The second out-coupling grating 33 is a transmissive grating located between the optical waveguide 10 and the optical lens 40, and is used for diffracting the light coupled into the optical waveguide 10 by the other of the two in-coupling grating 20, and the light diffracted by the second out-coupling grating 33 strikes the optical lens 40. The light diffracted by the first out-coupling grating 32 and the light diffracted by the second out-coupling grating 33 together form the light emitted from the optical waveguide 10.

As shown in FIG. 9, the first out-coupling grating 32 only modulates the light propagating from left to right, but does not modulate the light propagating from right to left; the second out-coupling grating 33 only modulates light propagating from right to left, and does not modulate light propagating from left to right. When propagating by total internal reflection to the position where the first out-coupling grating 32 is located, the light coupled into the optical waveguide 10 by the left in-coupling grating 20 is diffracted by the first out-coupling grating 32 to form diffracted light emitted towards the optical lens 40, which is not modulated by the second out-coupling grating 33, such that the light diffracted by the first out-coupling grating 32 directly passes through the second out-coupling grating 33 and strikes the optical lens 40; When propagating by total internal reflection to the position where the second out-coupling grating 33 is located, the light coupled into the optical waveguide 10 by the right in-coupling grating 20 is extracted by the second out-coupling grating 33.

Figure 10:
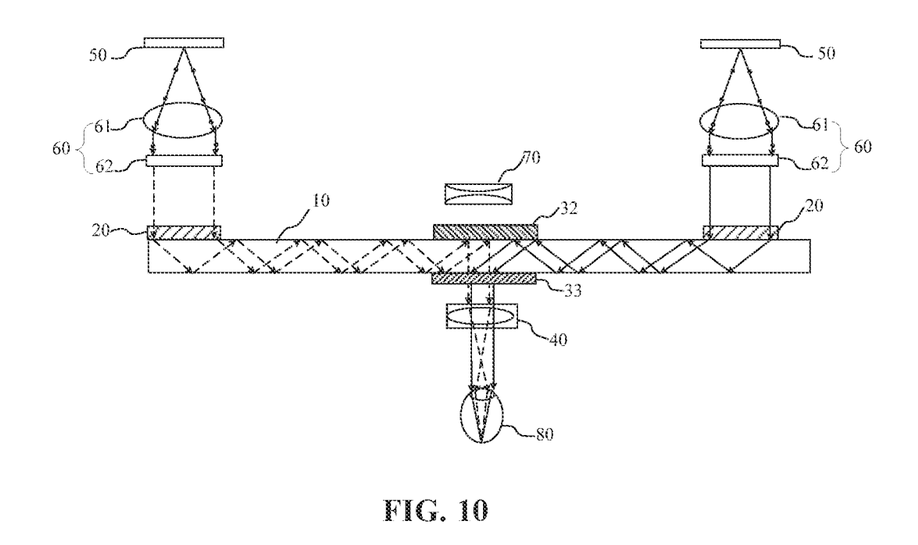
FIG. 10 is a schematic diagram of a near-to-eye display device according to some embodiments of the present disclosure.

FIG. 10 is a schematic diagram of a near-to-eye display device according to some embodiments of the present disclosure. The near-to-eye display device shown in FIG. 10 has a structure similar to that shown in FIG. 9, except that: the in-coupling gratings 20 in FIG. 10 are transmissive gratings, and each in-coupling grating 20 is located on a side of the optical waveguide 10 distal to the optical lens 40.

It should be noted that the near-to-eye display device in the embodiment of the present disclosure is not limited to the structure shown in FIG. 2 and FIGS. 8 to 10, and may alternatively adopt other structural forms. For example, both the in-coupling gratings 20 are reflective gratings located on a side of the optical waveguide 10 distal to the projectors 60, and the in-coupling gratings 20 and the optical lens 40 are located on opposite sides of the optical waveguide 10. For example, one of the two in-coupling gratings 20 is a transmissive grating located between the corresponding projector 60 and the optical waveguide 10; the other in-coupling grating 20 is a reflective lens located on a side of the optical waveguide 10 distal to the projector 60.

An embodiment of the present disclosure also provides an augmented reality apparatus including the near-to-eye display device described above. In addition, the augmented reality apparatus may further includes a wearing housing on which the near-to-eye display device is mounted.

It should be understood that the above embodiments are merely exemplary embodiments adopted to explain the principles of the present disclosure, and the present disclosure is not limited thereto. It will be apparent to a person skilled in the art that various changes and modifications may be made therein without departing from the spirit and scope of the present disclosure, and these changes and modifications also fall within the scope of the present disclosure.

What is claimed is:
1. A near-to-eye display device, comprising:
an optical waveguide;
a plurality of in-coupling gratings on one single surface of the optical waveguide and each configured to couple received parallel light into the optical waveguide for propagating by total internal reflection;
a plurality of display panels in one-to-one correspondence with the plurality of in-coupling gratings;
a plurality of projectors in one-to-one correspondence with the plurality of display panels, wherein each of the projectors is configured to modulate divergent light emitted from all positions of a corresponding display panel into parallel light irradiating towards a corresponding in-coupling grating, and polarization directions of the parallel light modulated by the plurality of projectors comprise a first polarization direction and a second polarization direction;
a light out-coupling structure on the surface of the optical waveguide and configured to extract the light propagating by total internal reflection in the optical waveguide to generate outgoing light from the optical waveguide; and an optical lens configured to receive the outgoing light, remain an outgoing direction of the outgoing light with the first polarization direction unchanged, and converge or diverge the outgoing light with the second polarization direction.

2. The near-to-eye display device of claim 1, wherein each of the projectors comprises:
a convex lens between the corresponding display panel and the optical waveguide, wherein the corresponding display panel is on a focal plane of the convex lens; and
a polarizer between the corresponding display panel and the optical waveguide, and configured to convert received natural light into linearly polarized light;
wherein polarization directions of the linearly polarized light converted by polarizers of the projectors comprise the first polarization direction and the second polarization direction.

3. The near-to-eye display device of claim 2, further comprising a compensation lens on a side of the optical waveguide distal to the optical lens, and configured to remain a direction of light with the first polarization direction unchanged and diverge or converge light with the second polarization direction.

4. The near-to-eye display device of claim 1, wherein each of the in-coupling gratings is a reflective grating on a side of the optical waveguide distal to the projectors.

5. The near-to-eye display device of claim 4, further comprising a compensation lens on a side of the optical waveguide distal to the optical lens, and configured to remain a direction of light with the first polarization direction unchanged and diverge or converge light with the second polarization direction.

6. The near-to-eye display device of claim 1, wherein each of the in-coupling gratings is a transmissive grating between the optical waveguide and a corresponding projector.

7. The near-to-eye display device of claim 6, further comprising a compensation lens on a side of the optical waveguide distal to the optical lens, and configured to remain a direction of light with the first polarization direction unchanged and diverge or converge light with the second polarization direction.

8. The near-to-eye display device claim 1, wherein a number of the in-coupling gratings is two, and the light out-coupling structure is between the two in-coupling gratings.

9. The near-to-eye display device of claim 8, wherein the light out-coupling structure comprises a composite grating configured to extract light coupled into the optical waveguide by the in-coupling gratings.

10. The near-to-eye display device of claim 9, wherein the composite grating is a reflective grating on a side of the optical waveguide distal to the optical lens.

11. The near-to-eye display device of claim 9, wherein the composite grating is a transmissive grating between the optical waveguide and the optical lens.

12. The near-to-eye display device of claim 8, wherein the light out-coupling structure comprises a first out-coupling grating and a second out-coupling grating,
the first out-coupling grating is on a side of the optical waveguide distal to the optical lens, and configured to diffract the light coupled into the optical waveguide by one in-coupling grating of the two in-coupling gratings, and the light diffracted by the first out-coupling grating is emitted to the optical lens; and
the second out-coupling grating is between the optical waveguide and the optical lens, and configured to diffract the light coupled into the optical waveguide by the other in-coupling grating of the two in-coupling gratings, the light diffracted by the second out-coupling grating is emitted to the optical lens, and the light diffracted by the first out-coupling grating and the light diffracted by the second out-coupling grating together form the outgoing light from the optical waveguide.

13. The near-to-eye display device of claim 1, wherein each in-coupling grating and the optical lens are on a same side of the optical waveguide.

14. The near-to-eye display device of claim 1, wherein the optical lens is a liquid crystal lens.

15. The near-to-eye display device of claim 1, further comprising a compensation lens on a side of the optical waveguide distal to the optical lens, and configured to remain a direction of light with the first polarization direction unchanged and diverge or converge light with the second polarization direction.

16. The near-to-eye display device of claim 15, wherein the compensation lens is a liquid crystal lens.

17. The near-to-eye display device of claim 1, wherein the first polarization direction is a polarization direction of S-polarized light, and the second polarization direction is a polarization direction of P-polarized light.

18. An augmented reality apparatus, comprising the near-to-eye display device of claim 1.

* * * * *